June 17, 1952  W. H. ABILDGAARD  2,600,602
LIVESTOCK SPRAYER
Filed Oct. 17, 1946  3 Sheets-Sheet 1
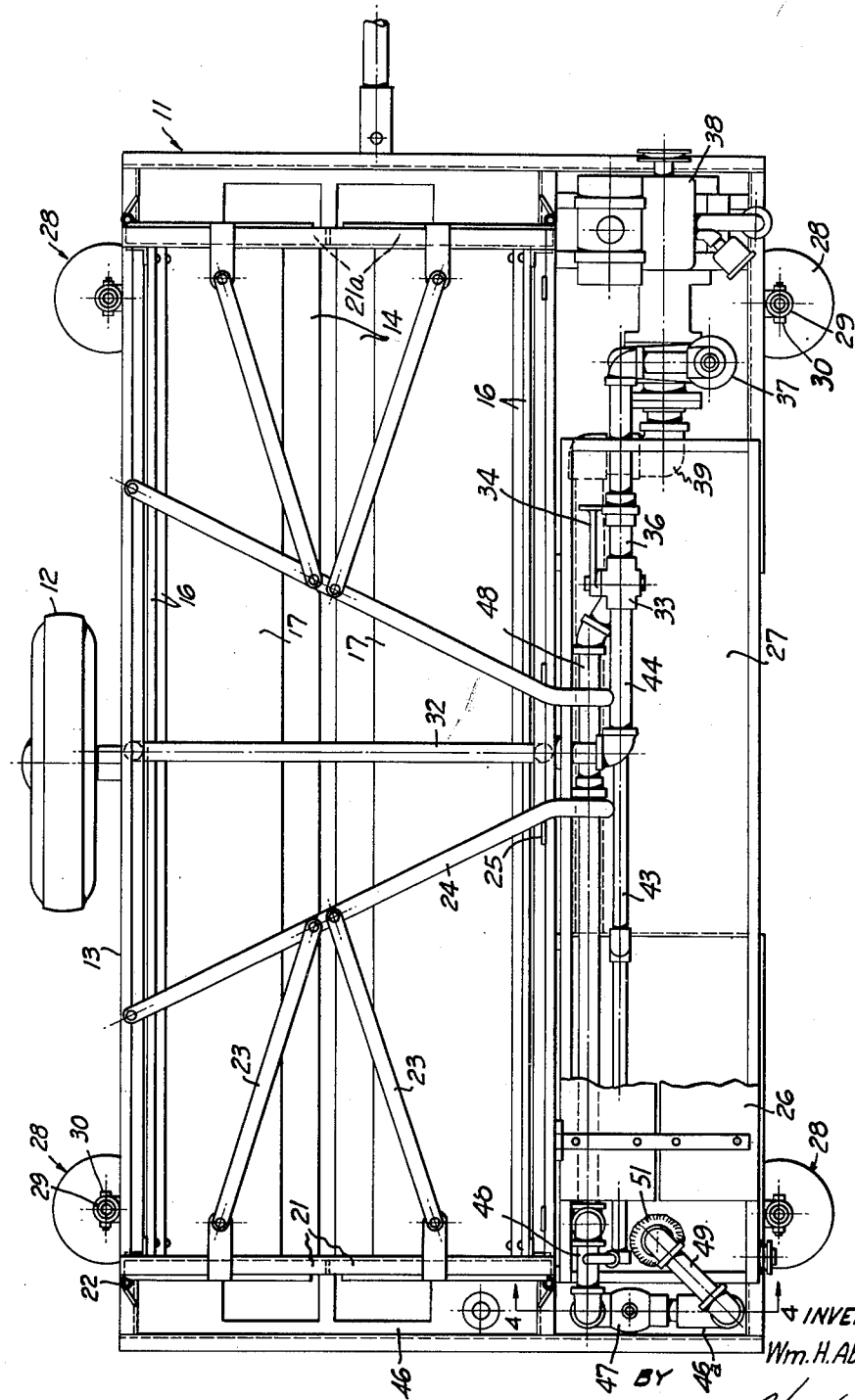
FIG_1
INVENTOR
Wm. H. Abildgaard
BY Harper Allen
ATTORNEY

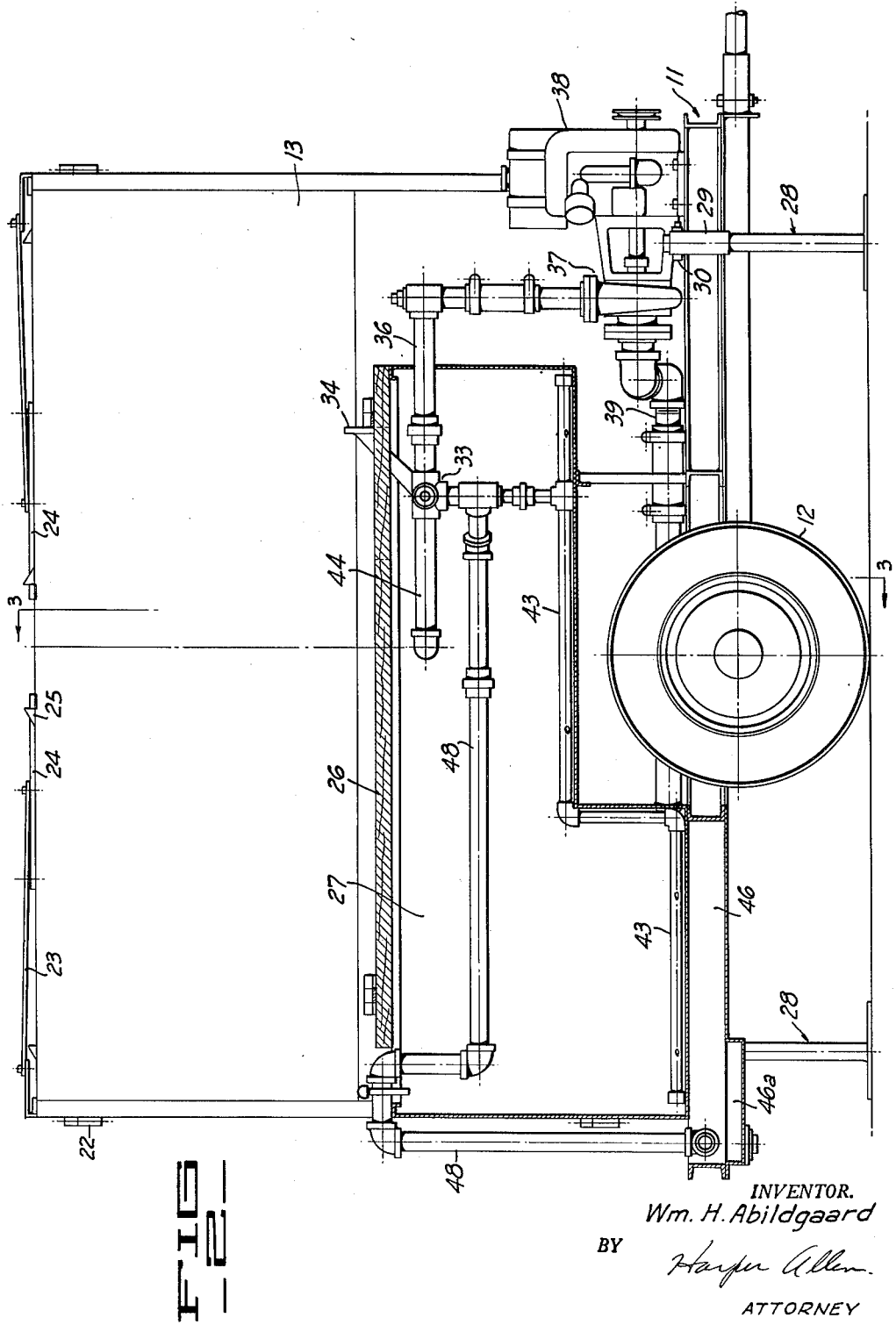

June 17, 1952 W. H. ABILDGAARD 2,600,602
LIVESTOCK SPRAYER
Filed Oct. 17, 1946 3 Sheets-Sheet 3
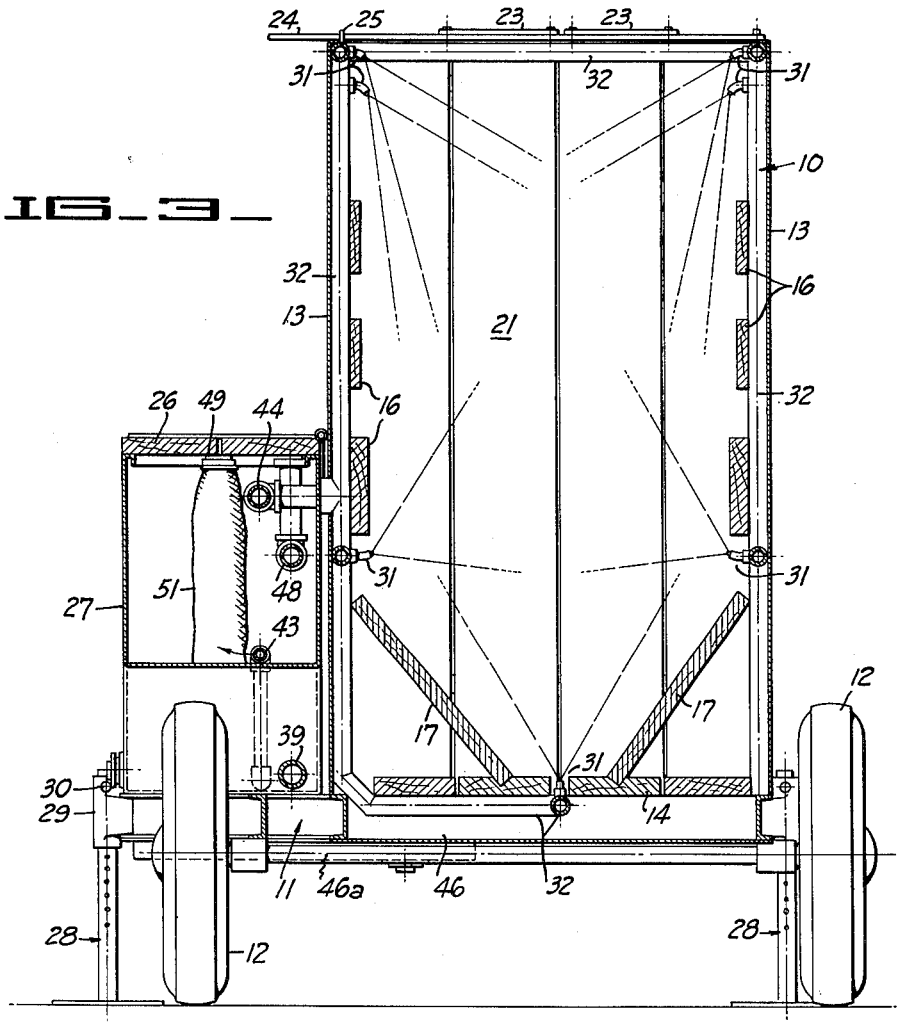
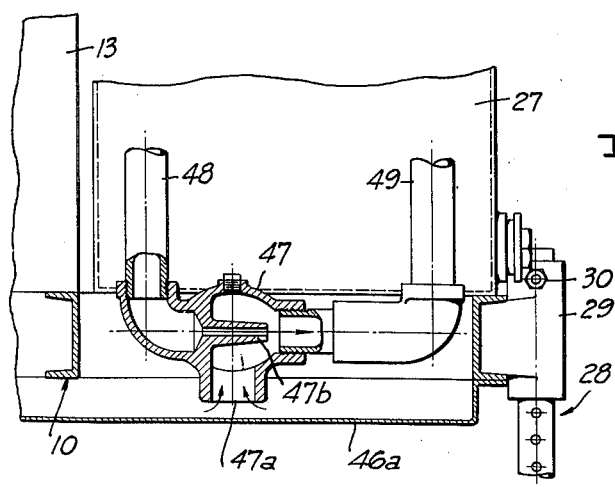
INVENTOR.
Wm. H. Abildgaard
BY
Harper Allen
ATTORNEY Patented June 17, 1952

2,600,602

UNITED STATES PATENT OFFICE 2,600,602

LIVESTOCK SPRAYER

William H. Abildgaard, San Jose, Calif., assignor, by mesne assignments, to Livestock Sprayer Mfg. Co., San Jose, Calif., a corporation of California Application October 17, 1946, Serial No. 703,891

4 Claims. (Cl. 119—159)

This invention relates to livestock sprayers and is concerned more particularly with the provision of an improved system for recovery and re-use of used spray liquid.

In this type of sprayer the livestock are passed through the sprayer, either one at a time or in small groups, and subjected to a pressure spray of liquid insecticide from advantageously disposed spray nozzles to effect complete wetting of the animals in a very short time for control of insect pests such as ticks, flies, lice, etc. This type of sprayer is illustrated in U. S. Letters Patent 2,529,530 of William Abildgaard and William H. Abildgaard, issued November 14, 1950, for Livestock Sprayers.

It is a general object of the invention to provide an improved sprayer for livestock which employs means for recirculation of used spray liquid.

It is another object of the invention to provide an improved sprayer for livestock which employs automatically operable injector means for pickup and re-circulation of used spray liquid.

Still another object of the invention is to provide a livestock sprayer which requires a minimum amount of labor for installation and use.

Other objects and advantages of the invention will be apparent from the description of a certain preferred embodiment thereof, taken in conjunction with the following drawings, in which:

Figure 1 is a plan view of the livestock sprayer embodying the invention.

Figure 2 is a side elevational view, partially in section, of the livestock sprayer.

Figure 3 is a transverse sectional view of the livestock sprayer.

Figure 4 is a detail sectional view of the injector re-circulating means taken along the line 4—4 of Figure 1.

Referring to the drawings, the sprayer includes a body having a frame 10 of pipe construction supported on a base portion 11 which may be formed of channels or other structural steel. The base portion 11 carries suitable journal supports for the wheels 12. The side walls of the body may comprise sheet steel members 13 which may be welded or otherwise secured to the frame 10 and a floor 14 of wooden planking extending longitudinally of the base frame 11. Also, the side walls 13 may be provided with planking or other protecting strips 16 so that the livestock will not contact the steel side plates. For purposes of locating the livestock within the sprayer in a central position, similar inclined centralizing guides 17 are provided.

The respective ends of the sprayer are closed by respective sets of doors including the front doors 21 pivoted at 22 and connected by links 23 with an operating handle 24 engaging a stop or catch 25 on the body, and the similar rear doors 21a. A platform may be provided along one side of the body as shown at 26. The platform 26 forms the cover for the supply tank 27 of the spray system referred to hereinafter.

When in use the weight of the sprayer and the animals therein may be removed from the wheels 12 by lowering suitable auxiliary supports 28. The supports 28 are slidable within suitable bosses or guides 29 on the frame and may be secured in adjusted position by means of bolts 30.

The spray system includes a plurality of series of nozzles 31 which are described in greater detail hereinafter and which are mounted on corresponding supply pipes 32. The supply pipes 32 are suitably inter-connected and the flow of liquid thereto is controlled by a two-way selector valve 33 (having a foot pedal control element 34) connected to the main delivery or discharge pipe 36 of a suitable pressure pump, such as a centrifugal pump 37. The source of power for the pump 37 may be a conventional internal combustion engine 38. The intake pipe 39 of the pump 37 is connected to the bottom of a supply tank 27 which may be of sheet steel construction and is disposed along the side of the trailer body with the cover 26 providing a platform for the operator.

Normally the selector valve 33 is so set by positioning of the valve control pedal 34 as to direct liquid from the pump discharge pipe 36 out of one valve outlet and into a branch delivery pipe 44 through which the liquid flows into the supply pipes 32 and thence through the nozzles 31. Liquid discharged by the nozzles 31 drains into the tank 46 from which it is returned to the supply tank 27 in a manner described hereinafter. The pump 37 receives recirculated liquid through the intake pipe 39.

For agitation of the spray solution or liquid, an apertured pipe system 43 is disposed in the supply tank 27 and is connected to another outlet of the two-way valve 33. To effect agitation of the liquid in the tank 27, the pedal 34 is moved to set the valve 33 for directing fluid into the pipe 43.

The nozzle system is of the type disclosed in the above-identified application, and comprises a plurality of sets of nozzles so arranged and located as to direct the pressure spray against the grain of the hair of the animal. In the present embodiment two opposed similar sets of spray nozzles 31 (Figure 3) are provided along the top portion of the side plates 13, two opposite intermediate sets of spray nozzles 31 are located along the side walls of the sprayer immediately below and protected by the lowermost side planks 16, and a bottom row of nozzles 31 is disposed between the floor planks 14.

These nozzles are all preferably of a construction to provide a substantially cone-shaped spray and the arrangement and location are such that all parts of the animal including the inner portions of the legs and the under parts of the animal are completely wetted.

To provide for re-circulation of the used spray liquid, the bottom of the sprayer is provided with a drain tank 46 which is formed by welding or otherwise securing a sheet metal bottom to the base channels 11. This drain tank has a sump portion 46a (Figures 2 and 4) for co-operation with an injector type hydraulic pick-up or pump 47 having an inlet opening 47a and an injector nozzle 47b. The branch inlet pipe 48 for the injector pickup extends from the high pressure inlet of the injector pump 47 to the outlet side of the two-way valve 33 and is in parallel with the agitating pipe system 43 so that when the nozzles are shut off and the engine and pump are in operation a major portion of the liquid withdrawn from the tank 27 will be re-circulated through the piping 48, the nozzle 47b and the discharge pipe 49 leading from the injector 47. The pipe 49 opens into a cylindrical filter bag 51 in the tank 27 extending vertically above the liquid level. Thus, whenever the nozzle system is shut off the injector 47 will pick up the drainage liquid from the drain tank 46 and re-introduce it into the system for reuse.

In operation, the pickup of used spray liquid will be effected immediately after spraying of each animal or group of animals when the nozzle system is shut off so that at all times an ample supply of spray solution will be maintained in the supply tank. By virtue of the above arrangement, a very simple automatic method of re-introduction of used spray liquid is provided, so that the only spray liquid lost from the system is that actually carried out by the animals being sprayed.

While I have shown a preferred embodiment of the invention, it will be seen that the invention is capable of variation and modification from the form shown so that its scope should be liimted only by the scope of the claims appended hereto.

I claim:

1. In a livestock sprayer, a body forming an enclosure for an animal; nozzle means disposed on said body for subjecting an animal in the enclosure to a spray; a spray liquid supply tank; a pressure pump having its intake in communication with said supply tank; a main delivery pipe communicating with the outlet of said pump; a selector valve having its intake connected to said main delivery pipe and having first and second outlets; a first branch pipe connected at its opposite ends respectively to one of said valve outlets and to said nozzle means; a drain tank operatively associated with said body for receiving spray liquid discharged from said nozzle means; a second branch pipe connected to the other of said valve outlets; an injector pump having its high pressure inlet connected to said second branch pipe, and having its low pressure intake in communication with said drain tank, and having an outlet for liquid flowing from said second branch pipe and from said drain tank through said injector; a filter in fluid communication with said supply tank arranged to discharge filtered spray liquid to said supply tank; a pipe connected with said injector pump for conducting liquid from said injector pump outlet to said filter; and a control element operatively associated with said valve operable selectively to direct liquid from said main delivery pipe to said first branch pipe and said nozzle means for spraying an animal in said enclosure, or to direct liquid from said main delivery pipe to said second branch pipe and said injector pump to thereby effect injector pick-up of liquid from said drain tank and delivery thereof to said filter.

2. In a livestock sprayer, a body forming an enclosure for an animal; nozzle means disposed on said body for subjecting an animal in the enclosure to a spray; a spray liquid supply tank; a drain tank for receiving spray liquid discharged from said nozzle means; a drain tank sump below the level of the drain tank; a pressure pump having its intake in communication with said supply tank; a main delivery pipe communicating with the outlet of said pump; a selector valve having its intake connected to said main delivery pipe and having first and second outlets; a first branch delivery pipe connected at its opposite ends respectively to one of said valve outlets and to said nozzle means; a second branch pipe connected to the other of said valve outlets; an injector pump having its high pressure inlet connected to said second branch pipe, and having its low pressure intake in communication with said sump, and having an outlet for liquid flowing from said second branch pipe and from said sump through said injector; a filter in fluid communication with said supply tank arranged to discharge filtered spray liquid to said supply tank; a pipe connected with said injector pump for conducting liquid from said injector outlet to said filter; and a control element operatively associated with said valve operable selectively to direct liquid from said main delivery pipe to said first branch pipe and said nozzle means for spraying an animal in said enclosure, or to direct liquid from said main delivery pipe to said second branch pipe and said injector pump to thereby effect injector pick-up of liquid from said sump and delivery thereof to said filter.

3. In a livestock sprayer, a body forming an enclosure for an animal; nozzle means disposed on said body for subjecting an animal in the enclosure to a spray; a spray liquid supply tank; a pressure pump having its intake in communication with said supply tank; a main delivery pipe communicating with the outlet of said pump a selector valve having its intake connected to said main delivery pipe and having first and second outlets; a first branch pipe connected at its opposite ends respectively to one of said valve outlets and to said nozzle means; a drain tank operatively associated with said body for receiving spray liquid discharged from said nozzle means; a second branch pipe connected to the other of said valve outlets; an injector pump having its high pressure inlet connected to said second branch pipe, and having its low pressure intake in communication with said drain tank, and having an outlet for liquid flowing from said second branch pipe and from said drain tank through said injector; a substantially cylindrical filter mounted in fluid communication with said supply tank to extend above the level of spray liquid therein and arranged to discharge filtered spray liquid to said supply tank; a pipe connected with said injector pump for conducting liquid from said injector outlet to said filter; and a control element operatively associated with said valve operable selectively to direct liquid from said main delivery pipe to said first branch pipe and said nozzle means for spraying an animal in said enclosure, or to direct liquid from said main delivery pipe to said second branch pipe and said injector pump to thereby effect injector pick-up of liquid from said drain tank and delivery thereof to said filter.

4. In a livestock sprayer, a body forming an enclosure for an animal; nozzle means disposed on said body for subjecting an animal in the enclosure to a spray; a spray liquid supply tank; a pressure pump having its intake in communication with said supply tank; a main delivery pipe communicating with the outlet of said pump; a selector valve having its intake connected to said main delivery pipe and having first and second outlets; a first branch pipe connected at its opposite ends respectively to one of said valve outlets and to said nozzle means; a drain tank operatively associated with said body for receiving spray liquid discharged from said nozzle means; a second branch pipe connected to the other of said valve outlets; an injector pump having its high pressure inlet connected to said second branch pipe, and having its low pressure intake in communication with said drain tank, and having an outlet for liquid flowing from said second branch pipe and from said drain tank through said injector; a filter in fluid communication with said supply tank arranged to discharge filtered spray liquid to said supply tank; a pipe connected with said injector pump for conducting liquid from said injector outlet to said filter; a control element operatively associated with said valve operable selectively to direct liquid from said main delivery pipe to said first branch pipe and said nozzle means for spraying an animal in said enclosure, or to direct liquid from said main delivery pipe to said second branch pipe and said injector pump to thereby effect injector pick-up of liquid from said drain tank and delivery thereof to said filter; and a further branch pipe communicating with said second branch pipe and extending along a substantial part of the bottom of said main supply tank, and having a series of spaced discharge openings for egress of liquid under high velocity into the bottom of said main supply tank for agitating the liquid therein.

WILLIAM H. ABILDGAARD.

REFERENCES CITED

The following references are of record in the file of this patent:

UNITED STATES PATENTS

| Number | Name | Date |
| --- | --- | --- |
| 44,876 | McKnight | Nov. 1, 1864 |
| 346,821 | Mock | Aug. 3, 1886 |
| 870,766 | Eaton | Nov. 12, 1907 |
| 883,132 | Goff | Mar. 24, 1908 |
| 925,053 | Sturgis | June 15, 1909 |
| 950,999 | Erlwein et al. | Mar. 1, 1910 |
| 976,242 | Wohlfahrt | Nov. 22, 1910 |
| 1,156,515 | Barba | Oct. 12, 1915 |
| 1,273,311 | Barnes | July 23, 1918 |
| 1,511,450 | Findlay | Oct. 14, 1924 |
| 2,427,840 | Davis | Sept. 23, 1947 |